United States Patent [19]

Thompson

[11] Patent Number: 5,458,011
[45] Date of Patent: Oct. 17, 1995

[54] COMPONENT TEST METHOD FOR VARIABLE SPEED MOTORS

[75] Inventor: Kevin D. Thompson, Indianapolis, Ind.

[73] Assignee: Carrier Corporation, Syracuse, N.Y.

[21] Appl. No.: 324,021

[22] Filed: Oct. 14, 1994

[51] Int. Cl.⁶ ................................... F25D 19/00
[52] U.S. Cl. ........................................... 73/865.9
[58] Field of Search ............................. 73/865.9, 116, 73/118.1

[56] References Cited

U.S. PATENT DOCUMENTS

| | | | |
|---|---|---|---|
| 2,918,822 | 12/1959 | Mann, Jr. | 73/865.9 |
| 3,626,261 | 12/1971 | Ham | 73/865.9 |
| 3,686,954 | 8/1972 | Motl | 73/865.9 |
| 3,771,321 | 11/1973 | Maksy | 73/865.9 |
| 4,159,642 | 7/1979 | Hudson et al. | 73/118.1 |
| 4,432,232 | 2/1984 | Brantley et al. | 73/865.9 |
| 4,939,942 | 7/1990 | Thome et al. | 73/865.9 |
| 5,038,625 | 8/1991 | Chen | 73/865.9 |
| 5,058,443 | 10/1991 | Riedmaier | 73/865.9 |

Primary Examiner—Richard Chilcot
Assistant Examiner—George M. Dombroske

[57] ABSTRACT

A method is disclosed for testing a heating and cooling system having a plurality of variable speed motors. Each motor has means for generating an output signal indicative of the motor's speed. The test method includes setting the first motor to a first speed setting and reading the output signal indicative of the motor speed. The first motor is then set to a second speed setting and the motor speed output signal is read again. This procedure is repeated for the remaining motors in the system. Then, each motor speed output reading is compared with a pre-determined acceptable range of speeds for that motor. If the reading value is outside of the desired of the desired range, an appropriate error signal is produced.

15 Claims, 9 Drawing Sheets

COMPONENT TEST METHOD FOR VARIABLE SPEED MOTORS

BACKGROUND OF THE INVENTION

This invention relates generally to a troubleshooting method, for service technicians operating in the field, to test a system with variable speed motors and, to provide the flexibility to individually eliminate the system components as the source of the system error by the strategic use of component simulator circuits.

Specifically, this invention relates to a high efficiency variable capacity condensing gas furnace equipped with an improved diagnostic circuitry to allow a service technician to test the furnace in the field. Two improved troubleshooting accessory simulator circuits are provided for strategic use to individually eliminate furnace system components as the source of the system error.

Existing variable speed gas furnaces operating in the field require the service technician when troubleshooting to make many voltage measurements across various components of the furnace system. This can be a cumbersome, complex and costly process. There is a need for a method of troubleshooting a variable speed gas furnace in the field that is not complicated or lengthy, and that does not require sophisticated equipment.

SUMMARY OF THE INVENTION

It is a primary object of the present invention to provide an improved method of troubleshooting a gas furnace in the field.

It is a further object of the present invention to provide a plurality of troubleshooting accessory simulator circuits relating to furnace system components for the purpose of individually eliminating the furnace system components as the source of the furnace system error.

A still further object of the present invention is to include a diagnostic test procedure embodied in the diagnostic test, which is programmed into the furnace control board to be run by service technicians when troubleshooting gas furnaces in the field.

These and other objects of the present invention are attained by a six-step method of testing the system having first and second variable speed motors capable of generating an output signal indicative of motor speed. A first step is that of providing the system control board having diagnostic circuitry and component simulating circuits that are connectable to the system control board for simulating the speed output of a motor. A second step is that of setting the speed of each motor to a first setting and a second different setting indicative of motor speed. A third step is that of reading a value of the output signals at the first and second settings. A fourth step is that of comparing the output readings with a pre-determined acceptable range of speeds at the first and second settings. A fifth step is that of producing an error signal when any of the speed settings are outside of the desired range. A sixth step is that of electrically isolating one of the motors and substituting therefor a component simulating circuit to determine if the error is present in the isolated motor.

BRIEF DESCRIPTION OF THE DRAWINGS

For a better understanding of these and other objects of the present invention, reference will be made to the following detailed description of the invention which is to be read in association with the accompanying drawings, wherein.

DESCRIPTION OF THE INVENTION

Figure 1:
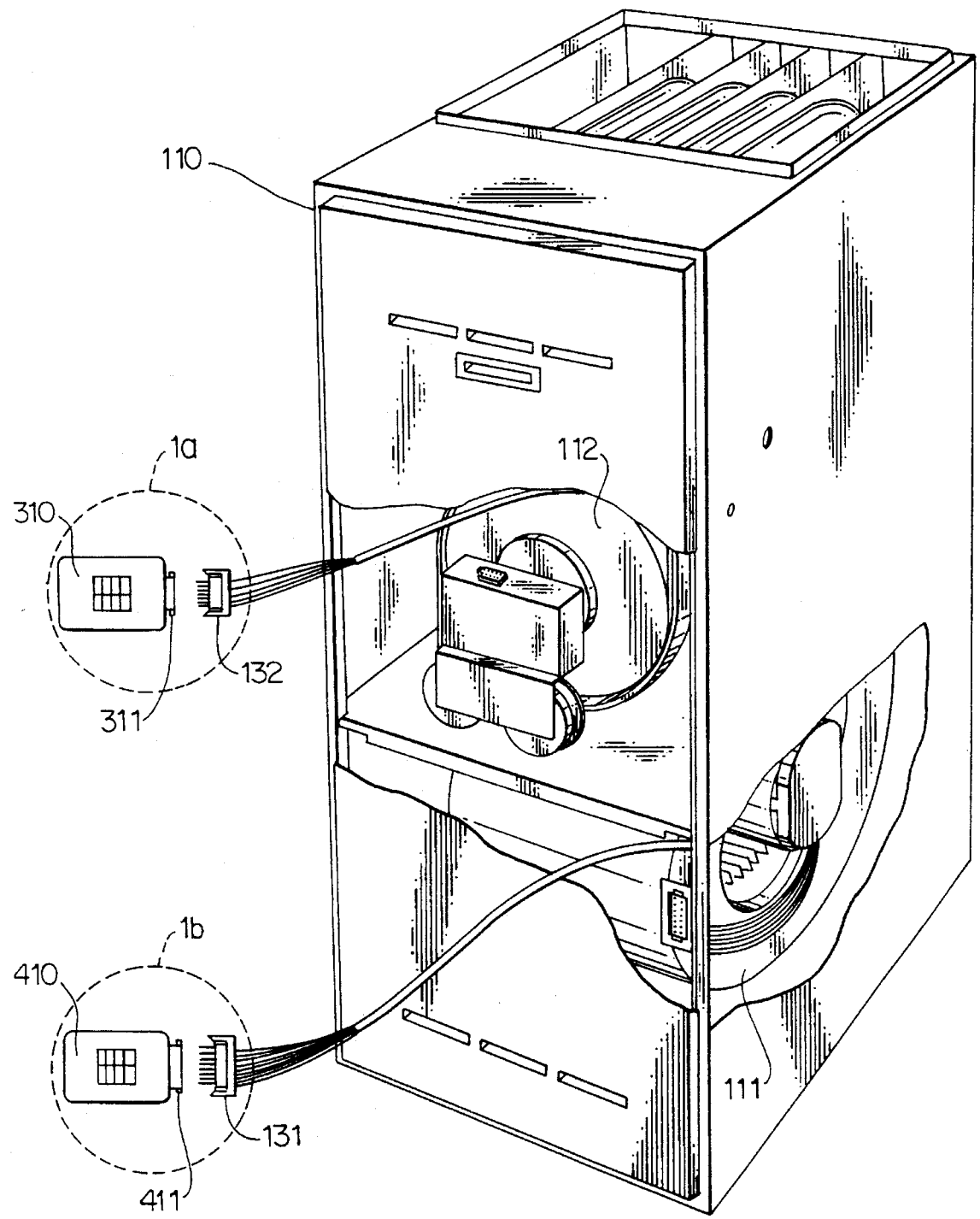
FIG. 1 is a perspective view with portions exploded, showing a high efficiency variable capacity condensing gas furnace embodying the teaching of the present invention.
Figure 1A:
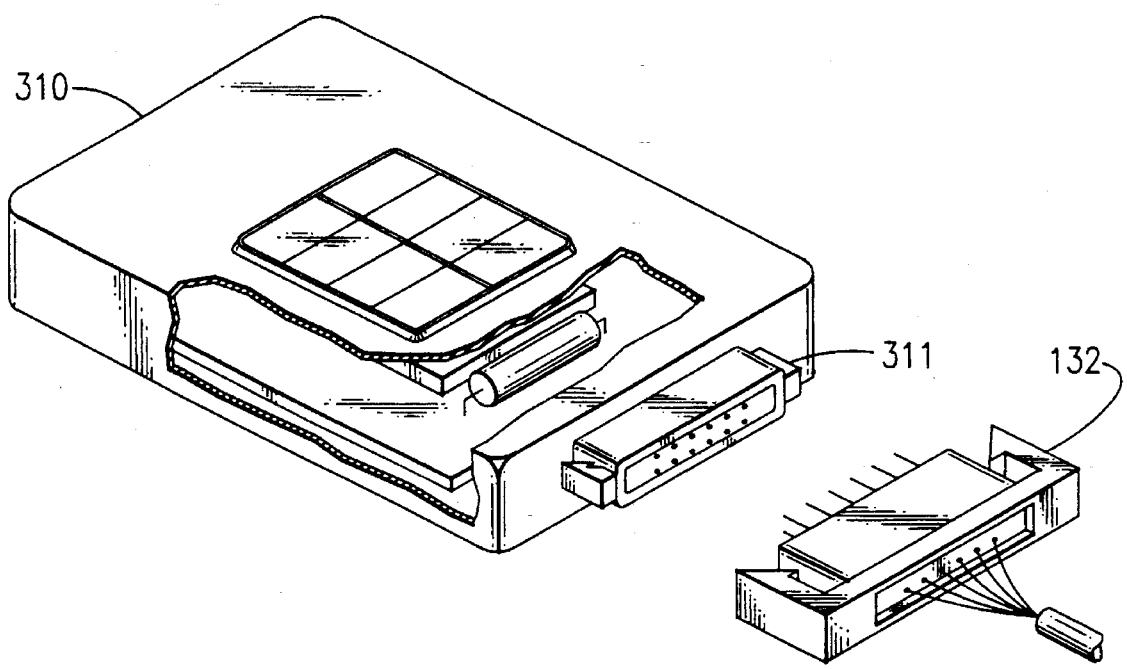
FIG. 1A is an exploded view of the inducer motor simulator circuit releasably connectable to the inducer motor connector.
Figure 1B:
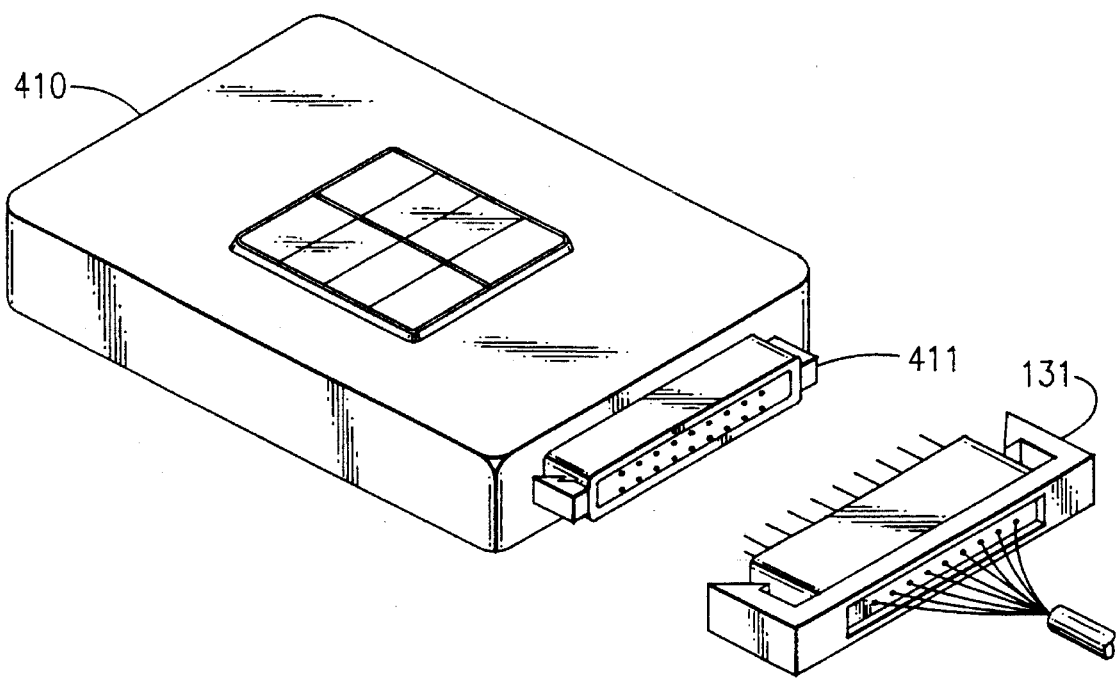
FIG. 1B is an exploded view of the blower motor simulator circuit releasably connectable to the blower motor connector.

Referring initially to FIG. 1, there is illustrated a high efficiency variable capacity condensing gas furnace generally referenced 110. The variable speed blower motor 111, which occupies the bottom third of the furnace unit, which provides a steady flow of heated air to a comfort air zone. Shown in FIG. 1B is an exploded view of the blower motor simulator circuit 410, which is used by a service technician during diagnostic troubleshooting. The blower motor connector 131 is detachably releasable from the blower motor 111 for easy connection to the blower motor simulator circuit connector 411. Embodied in the furnace unit is the variable speed inducer motor 112, which draws combustion air from outdoors to sustain proper combustion of a hydrocarbon fuel which is further used to heat the air provided to the comfort zone. Shown in FIG. 1A is an exploded view of the inducer motor simulator circuit 310, which is used by the service technician during diagnostic troubleshooting. The inducer motor connector 132 is detachably releasable from the inducer motor 112 for easy connection to the inducer motor simulator circuit connector 311. Although not shown, the furnace control board and diagnostic circuit is positioned along the far wall of the furnace unit.

Figure 2:
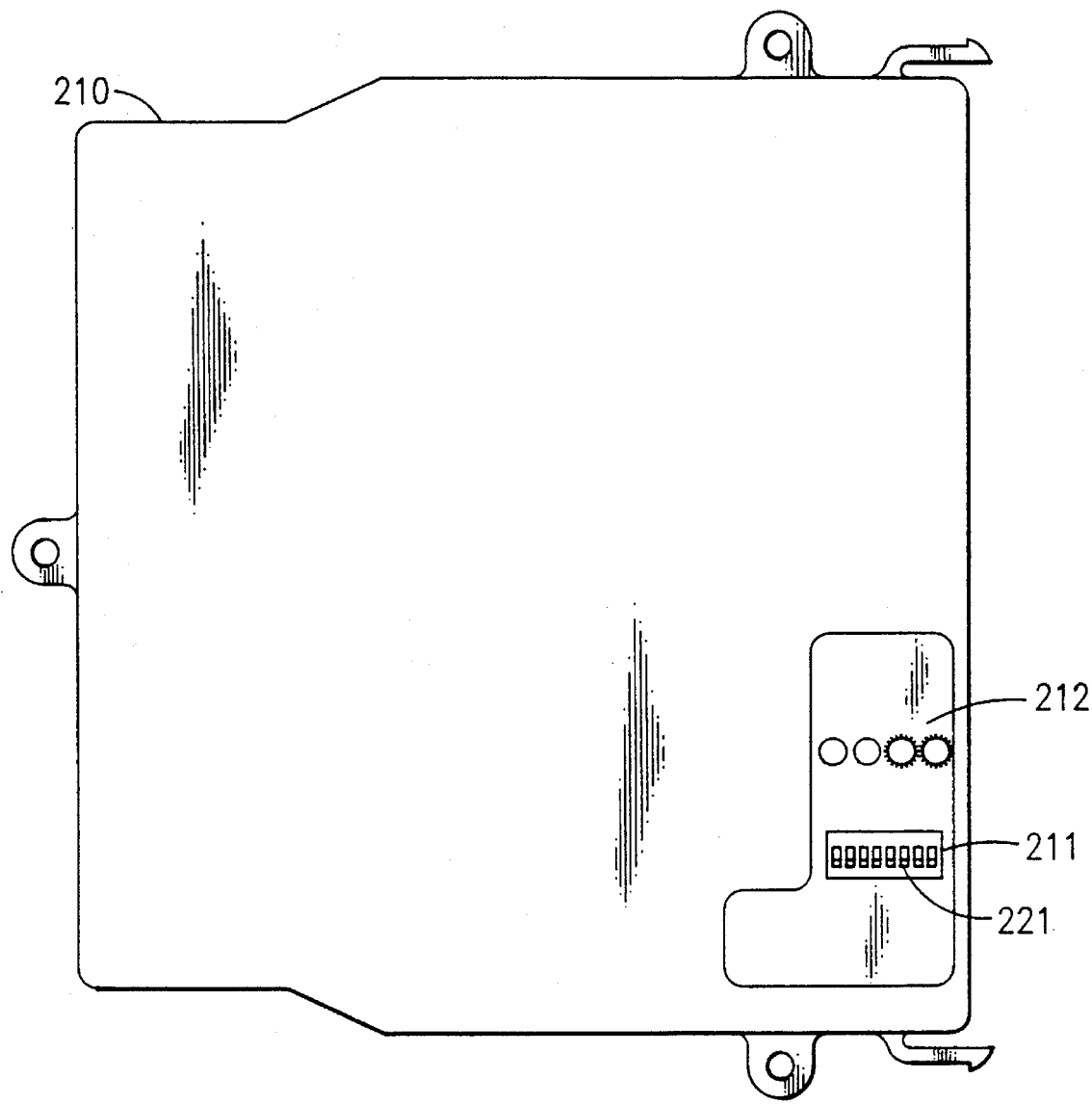
FIG. 2 is a plan view of the furnace control board.

The furnace control board generally referenced 210 is illustrated in FIG. 2. A setup switch panel 211 includes the diagnostic test switch 221 for commencing a test. The status and diagnostic LED light panel 212 displays fault codes during diagnostic troubleshooting.

Figure 3:
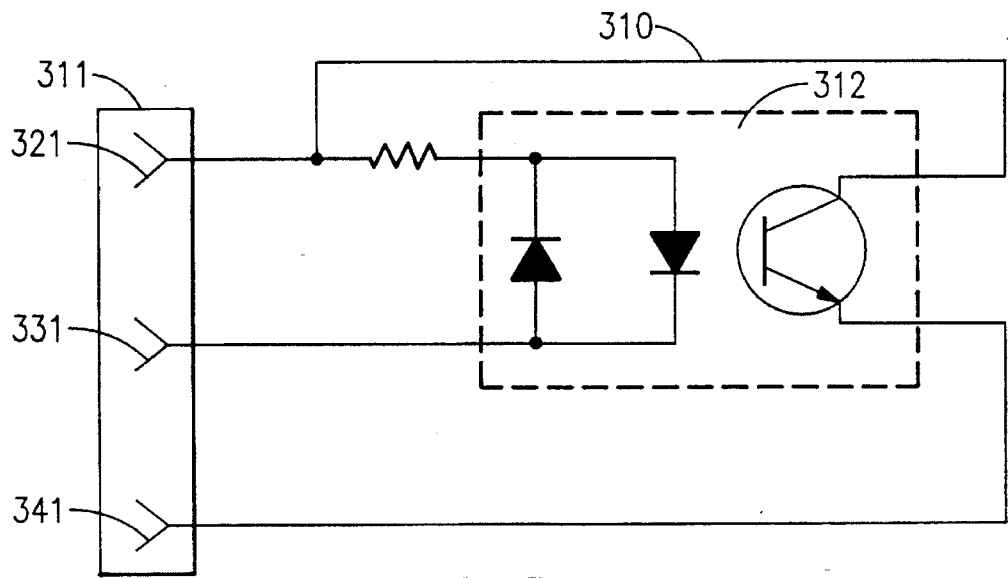
FIG. 3 is a circuit schematic of the inducer motor simulator.

Referring now to FIG. 3, there is shown the schematic of the inducer motor simulator circuit generally referenced as 310. The inducer motor simulator circuit 310 is used by the service technician during diagnostic troubleshooting to eliminate the inducer motor component as the source of the furnace system error. The inducer motor connector 132 is detachably releasable from the inducer motor 112 for easy connection to the inducer motor simulator circuit connector 311 (refer to FIG. 1). The connector 311 has two inputs, 12 VDC POWER input 321 and a motor speed control signal input, INDUCER SPEED INPUT 311, and one output, the actual motor speed, INDUCER RPM PULSE output 341. An opto-isolator device 312 has a dual function; it operates to optically isolate the INDUCER SPEED INPUT 331 signal from the INDUCER RPM PULSE 341 output signal and it drives the INDUCER RPM PULSE 341 line with the INDUCER SPEED INPUT 331 signal.

Figure 4:
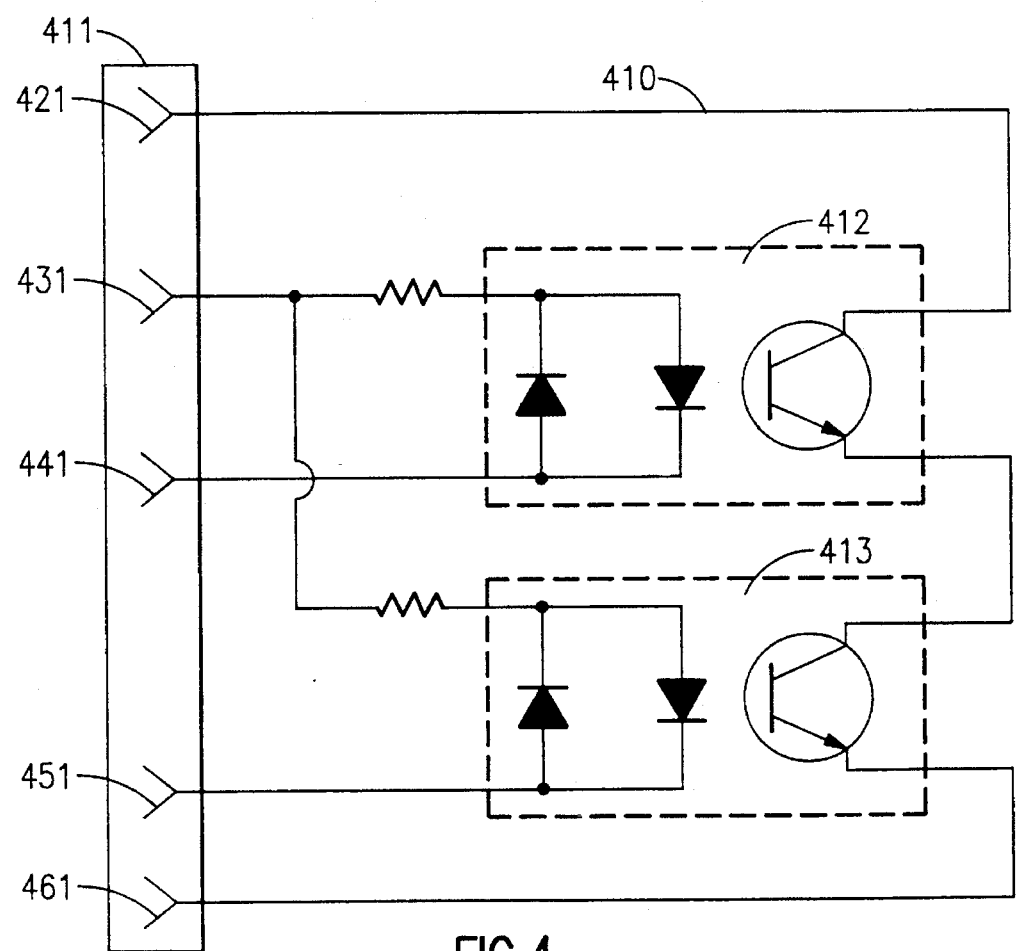
FIG. 4 is a circuit schematic of the blower motor simulator.
Figure 5A:
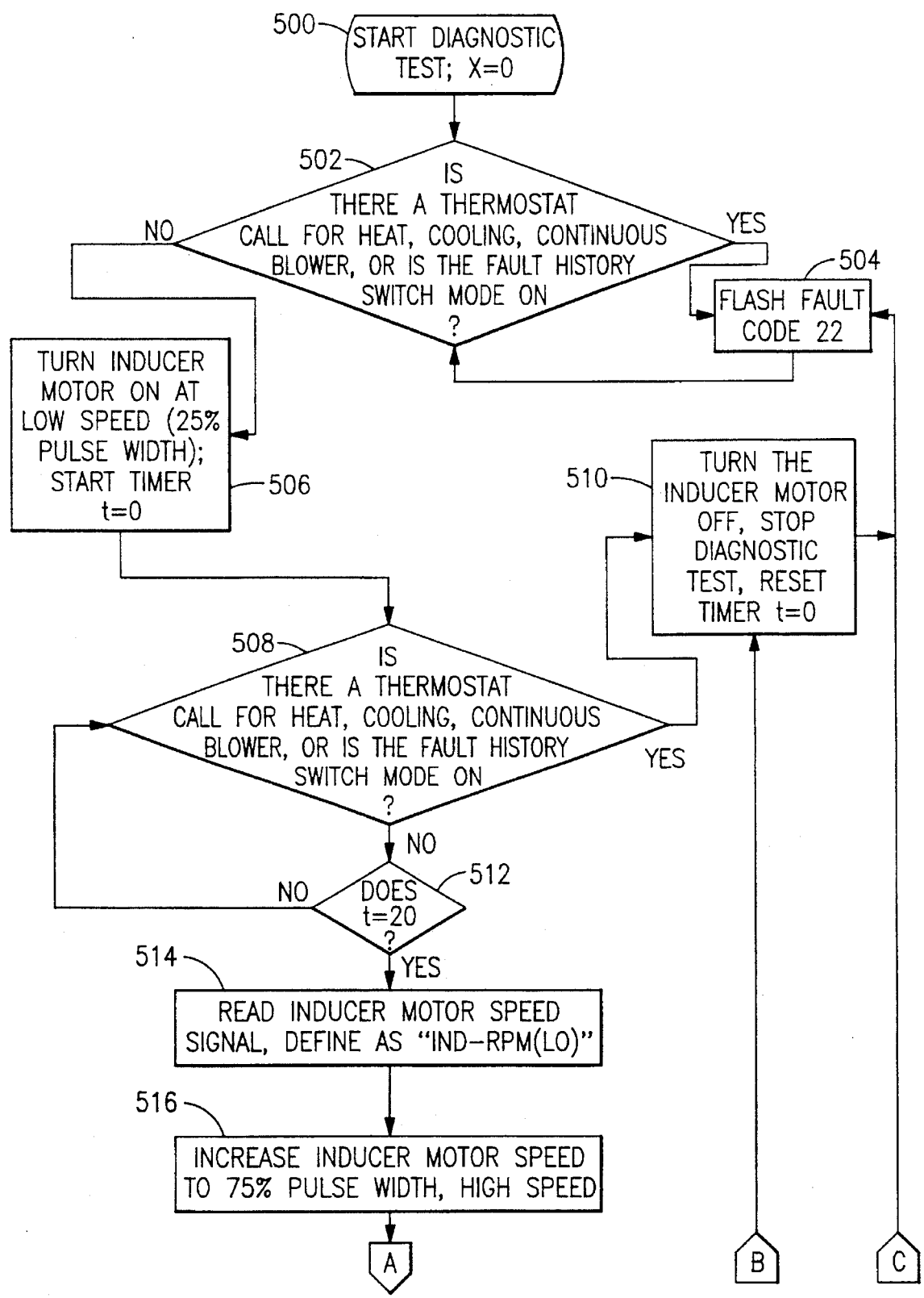
FIGS. 5A–5E comprise a flowchart illustrating the diagnostic test procedure embodied in the diagnostic circuit on the furnace control board.
Figure 5B:
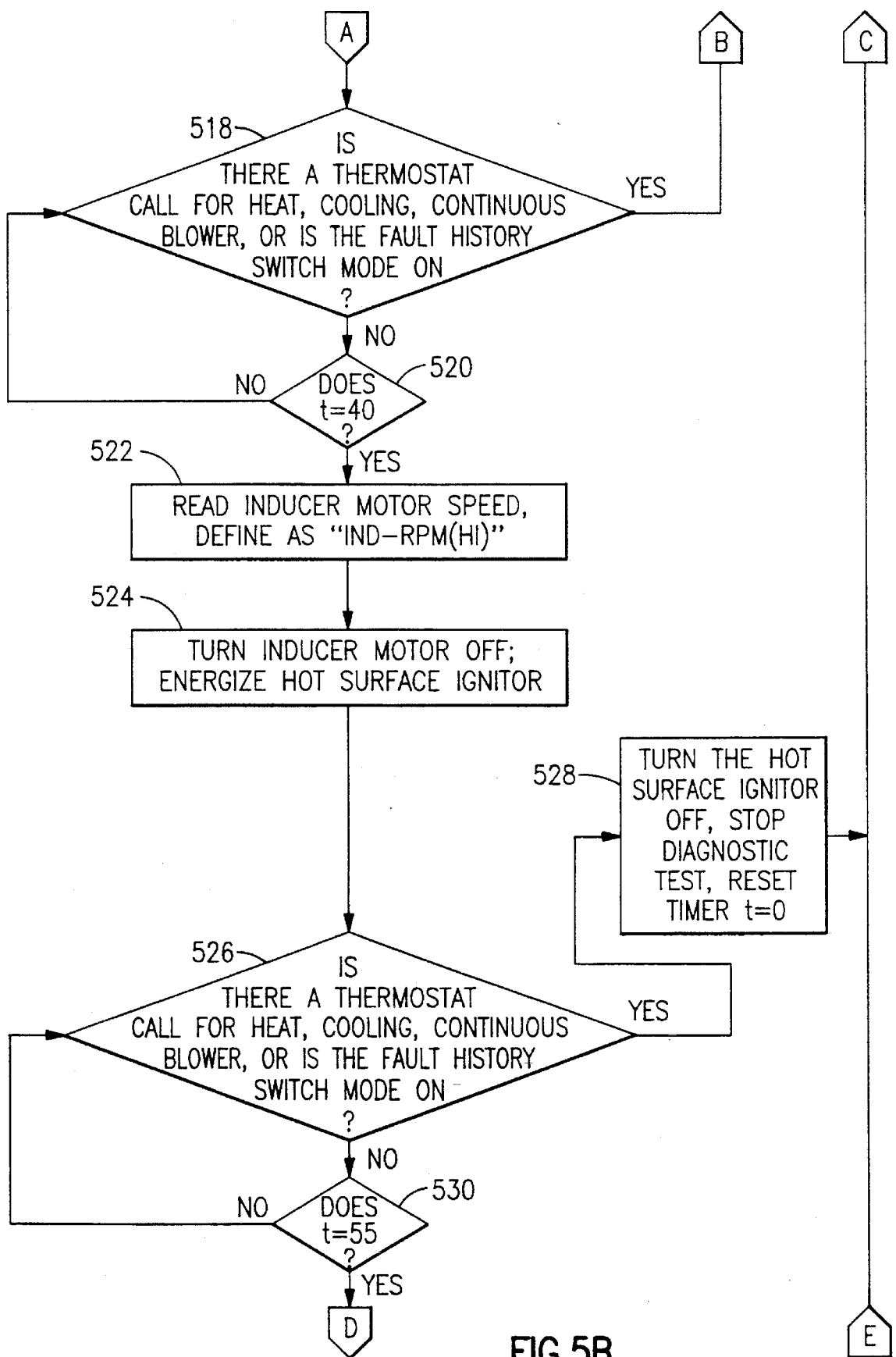
Figure 5C:
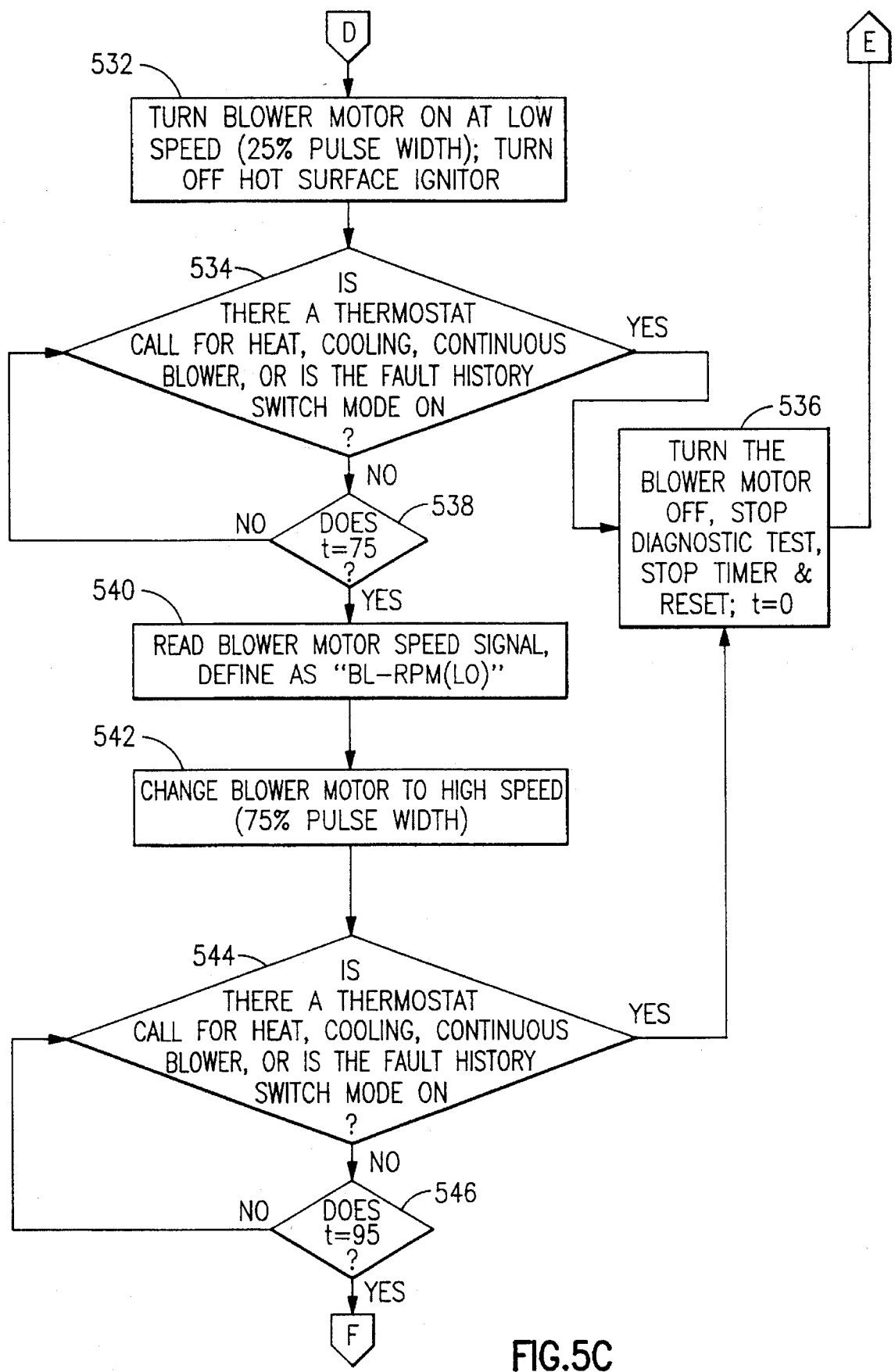
Figure 5D:
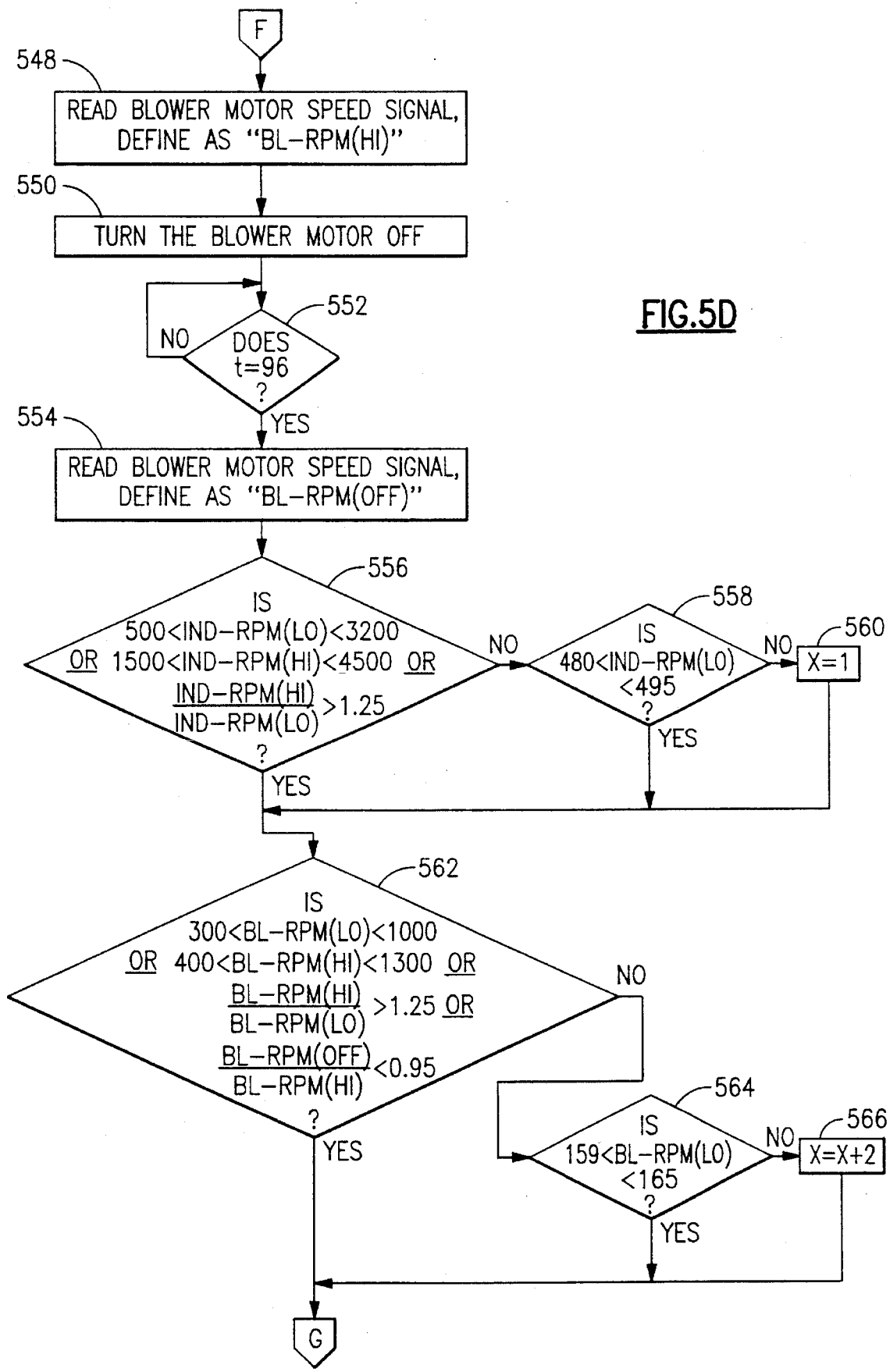
Figure 5E:
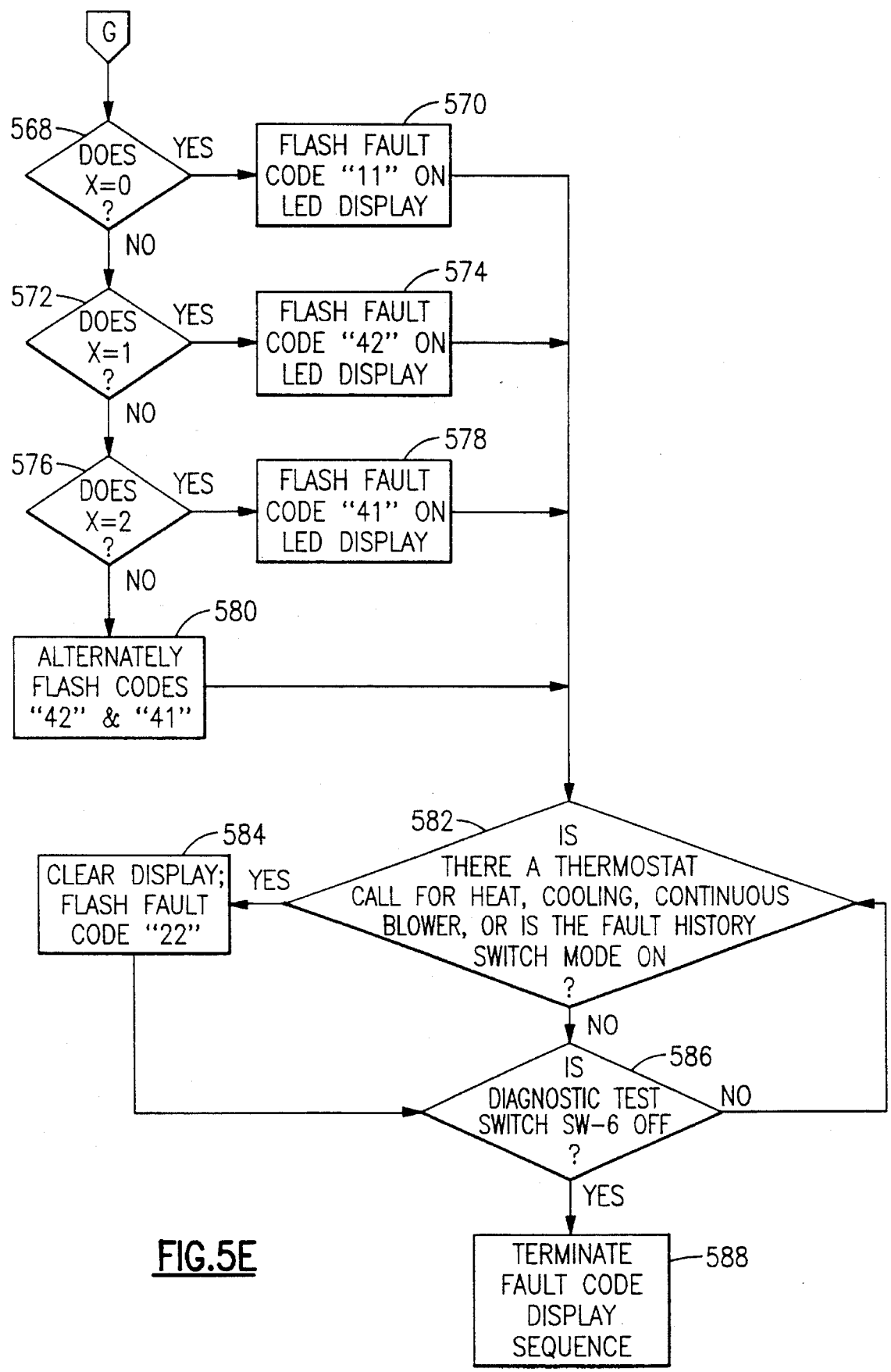

In FIG. 4, there is depicted the schematic of a blower motor simulator circuit generally referenced as 410. The blower motor simulator circuit 410 is used by the service technician during diagnostic troubleshooting to eliminate the blower motor component as the source of the furnace system error. The blower motor connector 131 is detachably releasable from the blower motor 111 for easy connection to the blower motor simulator circuit connector 411 (refer to FIG. 1). The connector 411 has four inputs: two 12 VDC POWER inputs 421 and 431, the BLOWER ON/OFF 441 control signal, and the motor speed control signal, BLOWER SPEED INPUT 451; and one output: the actual motor speed, BLOWER RPM PULSE 461. Opto-isolator devices 412 and 413 perform the same function as opto-isolator device 312 performs: optically isolating the input signal from the output signal and driving the output line with the input signal.

FIGS. 5A–5E comprise a flowchart illustrating the diagnostic test procedure embodied in the diagnostic test, which is programmed into the furnace control board. The diagnostic test is used for flushing out the source of the furnace unit system error. The diagnostic test switch 221 on the furnace control board 210 is switched ON to signal the start of the diagnostic test and fault variable S is reset to 0 at step 500. In step 502, the system is probed before commencing the diagnostic test, to insure that a thermostat call for heat, cooling or continuous blower is not interrupted or that the fault history display mode switch is not ON. Thus, if a thermostat call occurs or the fault history display mode switch is ON while the diagnostic test switch is ON, the diagnostic LED lights will display the fault code 22, in step 504 and loop back to step 502. If the system conditions in step 502 are not present, then the diagnostic test will continue uninterrupted to step 506. Step 502 is a complicated step that shall be referred to, hereinafter, as the "the thermostat call and/or fault history display mode check." In step 506, the inducer motor is turned on at low speed by driving a 25% pulse width signal onto the INDUCER SPEED INPUT 331 line; and the timer is reset to t=0.

The thermostat call and/or fault history display mode check is performed again in step 508. If a thermostat call is in progress and/or the fault history display mode switch is ON, then the inducer motor is turned off, the diagnostic test is halted, and the timer is reset to t=0 in step 510; and the diagnostic test returns to step 504 to flash the fault code 22. If the system conditions in step 508 are not present then the diagnostic test continues uninterrupted. In the next step, 512, the diagnostic test keeps looping back to step 508 until t=20 seconds, before taking a reading of the inducer motor speed INDUCER RPM PULSE 341 at step 514. The speed value is defined as IND-RPM(LO). The inducer motor speed is then increased to high speed by driving a 75% pulse width signal onto the INDUCER SPEED INPUT 331 line in step 516.

The thermostat call and/or fault history display mode check is performed again in step 518. If a thermostat call is in progress and/or the fault history display mode switch is ON, then the inducer motor is turned off, the diagnostic test is halted, and the timer is reset to t=0 in step 510; and diagnostic test returns to step 504 to flash the fault code 22. If the system conditions in step 518 are not present then the diagnostic test continues uninterrupted. In the next step 520, the diagnostic test keeps looping back to step 518 for 20 more seconds, until t=40, before taking a reading of the inducer motor speed, INDUCER RPM PULSE 341, at step 522. The speed value is defined as IND-RPM(HI). The inducer motor is then turned off and the hot surface ignitor is energized in step 524.

The thermostat call and/or fault history display mode check is performed again in step 526. If a thermostat call is in progress and/or the fault history display mode switch is ON, then the hot surface ignitor is turned off, the diagnostic test is halted, and the timer is reset to t=0 in step 528; and the diagnostic test returns to step 504 to flash the fault code 22. If the system conditions in step 526 are not present then the diagnostic test continues uninterrupted. In the next step 530, the diagnostic test keeps looping back to step 526 for 15 more seconds, until t=55. Then, in step 532, the hot surface ignitor is turned OFF, the BLOWER ON/OFF 441 line is turned ON, and BLOWER SPEED INPUT 451 line is driven with a 25% pulse width signal.

The thermostat call and/or fault history display mode check is performed again in step 534. If a thermostat call is in progress and/or the fault history display mode switch is ON, then the blower motor is turned off, the diagnostic test is halted, and the timer is reset to t=0 in step 536; and the diagnostic test returns to step 504 to flash the fault code 22. If the system conditions in step 534 are not present then the diagnostic test continues uninterrupted. In the next step 538, the diagnostic test keeps looping back to step 534 for 20 more seconds, until t=75, before taking a reading of the blower motor speed, BLOWER RPM PULSE 461, at step 540. The speed value is defined as BL-RPM(LO). The blower motor speed is increased to high speed by driving a 75% pulse width signal onto the BLOWER SPEED INPUT line 451 at step 542.

The thermostat call and/or fault history display mode check is performed again in step 544. If a thermostat call is in progress and/or the fault history display mode switch is ON, then the blower motor is turned off, the diagnostic test is halted, and the timer is reset to t=0 in step 536; and the diagnostic test returns to step 504 to flash the fault code 22. If the system conditions in step 544 are not present then the diagnostic test continues uninterrupted. In the next step 546, the diagnostic test keeps looping back to step 544 for 20 more seconds, until t=95, before taking a reading of the blower motor speed, BLOWER RPM PULSE 461, at step 548. The speed value is defined as BL-RPM(HI). The blower motor is then turned off in step 550. In step 552, the diagnostic test waits for 1 more second, t=96, before taking a reading of the blower motor speed, BLOWER RPM PULSE 461, at step 554. The speed value is defined as BL-RPM(OFF).

Commencing at step 556, the furnace control board performs a series of comparisons with the various motor speed values taken. If the IND-RPM(LO) value is between 500 and 3200 rpm, the IND-RPM(HI) value is between 1500 and 4500 rpm, or if the ratio IND-RPM (HI)/IND-RPM(LO) is greater than 1.25, then the diagnostic test continues at line 562. If any of the conditions in step 558 are not met, then the diagnostic test checks whether the inducer motor simulator circuit 310 is connected for diagnostic trouble shooting. The inducer motor simulator circuit 310 only generates a motor speed between 480 and 495 rpm. Thus, if the motor speed is between 480 and 495 rpm, then the diagnostic test continues at step 562. If the condition at step 558 is not met, then the variable X is assigned the value 1 at step 560, flagging the inducer motor fault code, and the diagnostic test continues to step 562.

At step 562, the furnace control board performs another series of comparisons with the remainder of the motor speed values taken. If the BL-RPM(LO) value is between 300 and 100 rpm, the BL-RPM(HI) value is between 400 and 1300, the ratio BL-RPM(HI)/BL-RPM(LO) is greater than 1.25 and the ratio BL-RPM (OFF)/BL-RPM(HI) is less than 0.95, then continue at line 568. If any of the conditions in step 562 are not met, the blower motor simulator circuit 410 only generates a motor speed between 159 and 165 rpm. Thus, if the BL-RPM(LO) value is between 159 and 165 rpm, then the diagnostic test continues at step 568. If the condition at step 564 is not met, then the variable X is incremented by 2 at step 566, flagging the blower motor fault code, and the diagnostic test continues to step 568.

Commencing at step 568, the diagnostic test determines which system component is faulty and displays the associated fault code. If the variable X has a value of 0, then the fault code 11 is flashed at step 570, and the diagnostic test jumps to step 582. If X does not have a value of 0, then the diagnostic test continues. If X has a value of 0, then the diagnostic test continues. If X has a value of 1 at 572, then the fault code 42 is flashed at step 574, and the diagnostic test jumps to step 582. If X does not have a value of 1, then the diagnostic test continues. If X has a value of 2 at step 576, then the fault code 41 is flashed at step 578, and the diagnostic test jumps to step 582. If X does not have a value of 2, then the fault codes 41 and 42 are alternately flashed at step 580 and the diagnostic test continues to step 582.

The thermostat call and/or fault history display mode check is performed again in step 582. If a thermostat call is in progress and/or the fault history display mode switch is ON, then the fault code LED display is cleared, the fault code 22 is flashed at step 584, and the diagnostic test continues. If the system conditions in step 582 are not present then the diagnostic test jumps to step 586. The diagnostic test then waits for the service technician to turn the diagnostic test switch 221 OFF at step 586. Until the diagnostic test switch 221 is turned OFF, the diagnostic test will continuously loop back to step 582. Once the diagnostic test switch 221 is turned OFF, the diagnostic test will terminate the fault code display sequence at step 588, completing the test.

As can be seen from the above description, the present invention is an improvement over the prior art in that, in provides the service technician in the field with a diagnostic method to test a system with variable speed motors and the flexibility to individually eliminate the system components as the source of the system error by the strategic use of component simulator circuits. In contrast, the prior art requires the service technician when troubleshooting to make many voltage measurements across the various components of the system, when can be a cumbersome, complex and costly process.

While this invention has been explained with reference to the structure disclosed herein, it is not confined to the details set forth and this application is intended to cover any modifications and changes as may come within the scope of the following claims:

What is claimed is:

1. A method of testing a heating and cooling system having a plurality of variable speed motors associated therewith and means for generating an output signal indicative of the motor's speed, including the steps of:

setting the speed of each motor to a first setting and a second different setting indicative of motor speed;

reading the value of the output signals at said first and said second settings;

comparing said output readings with a pre-determined acceptable range of speeds at said first and said second settings; and producing an error signal when any of the speed settings are outside of the desired range.

2. The method of claim 1, that includes the step of embodying said motors in a high-efficiency variable capacity condensing gas furnace.

3. The method of claim 2, wherein said motors include a variable speed inducer motor and a variable speed blower motor.

4. The method of claim 3, the step of sequentially regulating said inducer motor at a first speed and a second higher speed and then, sequentially setting said blower motor at a first speed and a second higher speed.

5. In the method of claim 1, disabling the test in the event that the system calls for heating or cooling.

6. In the method of claim 3, disabling the test in the event that the system calls for continuous blower operation.

7. The method of claim 1, including an additional step of producing a no-fault signal when the speed settings are within the desired range.

8. A method of testing a heating and cooling system having first and second variable speed motors capable of generating an output signal indicative of motor speed, including the steps of:

providing a system control board having diagnostics and component simulating circuits that are connectable to said system control board for simulating the speed output of a motor;

setting the speed of each motor to a first setting and a second different setting indicative of motor speed;

reading the value of the output signals at said first and said second settings;

comparing said output readings with a pre-determined acceptable range of speeds at said first and said second settings;

producing an error signal when any of the speed settings are outside of the desired range; and electrically isolating one of said motors and substituting therefor a component simulating circuit to determine if the error is present in the isolated motor.

9. The method of claim 8, including the further step of containing said motors in a high-efficiency variable capacity condensing gas furnace.

10. The method of claim 9, wherein said motors include a variable speed inducer motor and a variable speed blower motor.

11. The method of claim 10, initially sequentially setting said inducer motor at a first speed and a second higher speed and then sequentially setting said blower motor at a first speed and a second higher speed.

12. The method of claim 11, that further includes the steps of providing an inducer motor simulator circuit and a blower motor simulator circuit.

13. In the method of claim 8, disabling the test in the event that the system calls for heating or cooling.

14. In the method of claim 10, disabling the test in the event that the system calls for continuous blower operation.

15. The method of claim 8, including an additional step of producing a no-fault signal when the speed settings are within the desired range.

* * * * *